Jan. 7, 1941.  W. ROSENHAFT  2,228,183
PHOTOGRAPH STUDIO APPARATUS
Filed Dec. 23, 1937   2 Sheets-Sheet 1
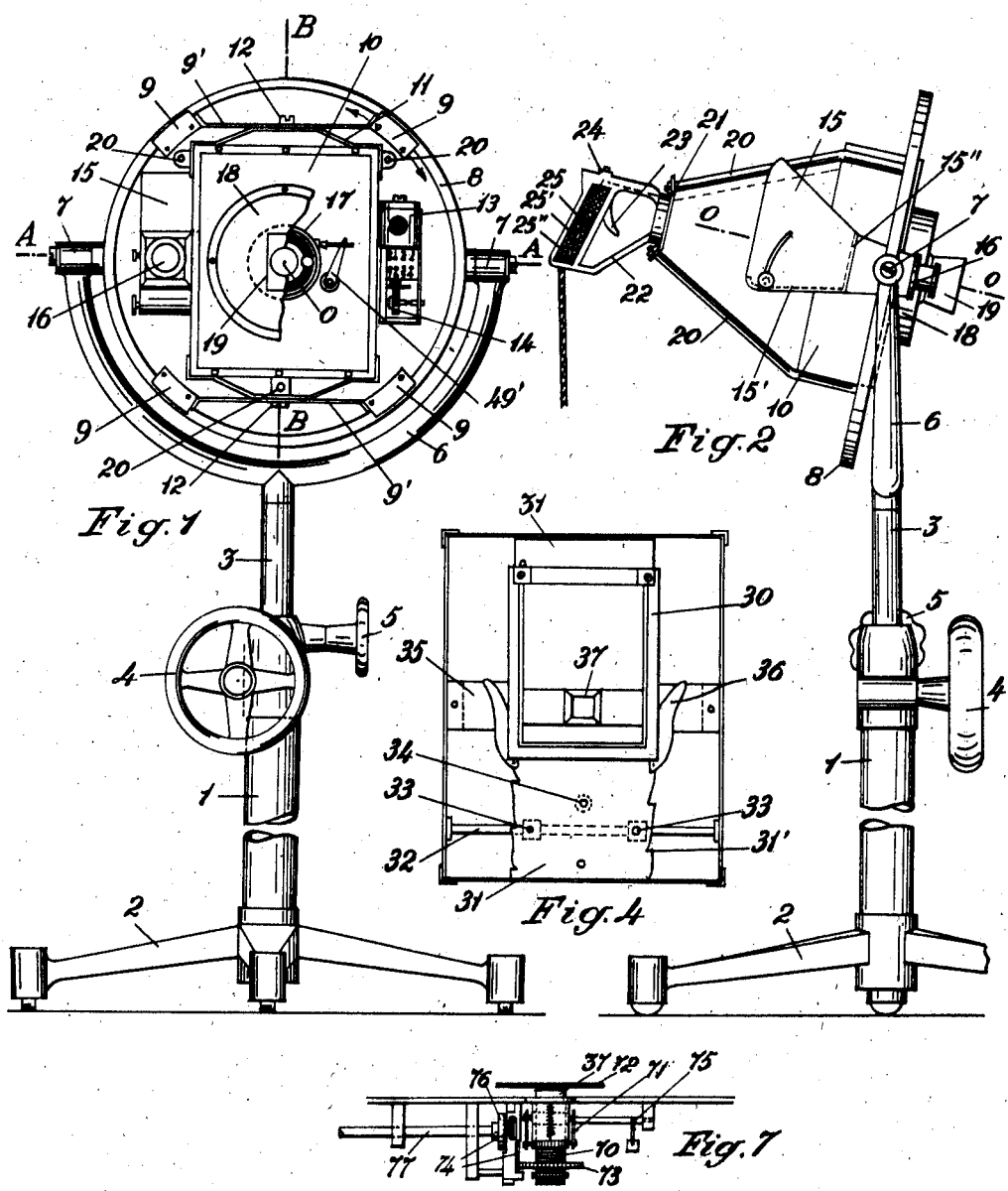
Inventor
W. Rosenhaft
By
E. F. Wenderoth
Atty

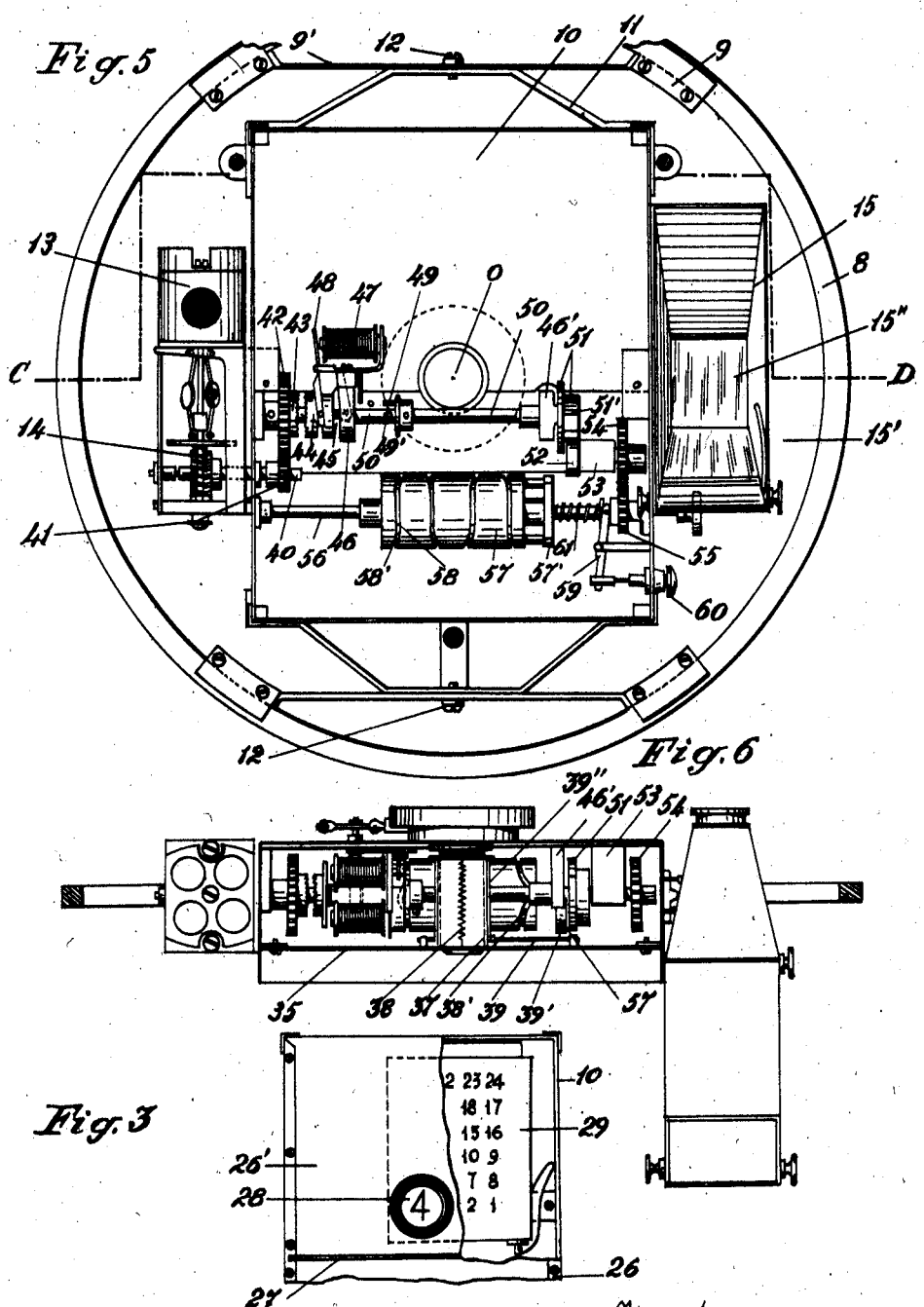

Patented Jan. 7, 1941

2,228,183

UNITED STATES PATENT OFFICE 2,228,183

PHOTOGRAPH STUDIO APPARATUS

Walter Rosenhaft, Rome, Italy

Application December 23, 1937, Serial No. 181,436
In Italy February 19, 1937

3 Claims. (Cl. 88—16)

This invention relates to a tripod mounted photographing apparatus for use in studios and is particularly designed for taking a series of negatives on the same sensitive layer. Heretofore the persons photographed have been obliged to change their positions in front of a fixed apparatus which caused all of the pictures in a series to be somewhat monotonous. It is an object of the invention to eliminate this disadvantage.

A further object of the invention is to provide an apparatus which is easily moved about the particular subject and which is also provided with suitable mechanism whereby the subject may be photographed from any desired angle.

It is also an object of the invention to provide an apparatus equipped with a pistol grip and means associated therewith whereby the operator may control the lighting and the shutter with the same hand by which the apparatus is moved. This permits the operator to give all his attention to the subject and the mechanical movements of the sensitive layer is taken care of automatically.

A still further object of the invention is to provide a tripod mount for the camera which is adjustable in height and also to provide a cardanic suspension for the camera.

A further object is to provide an electric motor for controlling the movements of the sensitive layer. In an apparatus provided with a cardanic suspension which is movable under a very light pressure, a manual operation of the sensitive plate or a mechanical transmission manually operated would be very inconvenient. Therefore all movements of the apparatus with the exception of the aiming of the camera are secured by electrical means.

It is a still further object of the invention to provide means electrically operated whereby after an exposure has been taken the sensitive plate is advanced immediately to the nearest position.

It is a still further object of the invention to provide the apparatus with sighting means such as a ground glass plate which is provided with a cooperating mirror in order to reflect the image in upright position. Preferably the sighting means produces an image considerably larger than the image produced by the camera lens. The sighting means is preferably placed at the side of the camera opposite to where the electric motor is positioned in order to properly balance the mechanism.

With these and other objects in view which will become apparent from the detailed description below the invention is shown in the drawings in which:

Figure 1 is a front elevational view of the apparatus with portions broken away for greater clearness;

Figure 2 is a side view of the apparatus shown in Figure 1;

Figure 3 is an elevational view of the rear of the camera with parts broken away;

Figure 4 is an elevational view illustrating the frame for holding the sensitive plate and the means whereby the plate frame is moved vertically;

Figure 5 is a rear elevational view of the camera on a larger scale illustrating the mounting of the motor and the sighting means and with the plate frame removed;

Figure 6 is a sectional view taken along the section line C—D of Figure 5; and

Figure 7 is a plan view of a device for interconnecting the lens of the sighting means with the lens of the camera in order to secure synchronous focusing thereof.

Referring to Figures 1 and 2 the tripod mounting comprises the vertical column 1 and the tripod 2. The tripod is preferably provided with wheels in order to move the apparatus easily. A shaft 3 telescopes in the column 1 and is provided with rack teeth (not shown) which mesh with a gear wheel (not shown) operated by the hand wheel 4. The shaft 3 may be locked at any desired height by means of the hand wheel 5.

A semicircular arm 6 is mounted at the top of the shaft 3 and is provided with sockets 7 for receiving the trunnions of the ring 8 so that the ring may rotate about the horizontal axis A—A. This permits the camera 10 to be directed upwardly or downwardly. The ring 8 is provided with two pairs of sliding guides 9 which are joined by the two bars 9'. Stirrups 11 are pivotally connected at 12 to the bars 9' so that the camera may be rotated about the axis B—B. The above described mounting of the camera permits complete freedom of movement in every direction so that the subject may be photographed from any desired angle and the angle changed after each exposure with the greatest facility.

Referring to Figure 1 a motor 13 is positioned at one side of the camera together with a reduction gearing 14 (see Figure 5) which through the intermediate shaft 40 and a spur gear 41 rotates the spur gear 42 freely mounted on the shaft 50. One portion 43 of a coupling 43, 44 is fixed to the gear 42.

On the other side of the apparatus from the motor there is provided the sighting means 15 provided with the lens 16. As may be seen from Figure 2 the sighting means 15 is provided with a ground glass plate 15" on which the lens 16 projects the image. In order to reverse the image on the plate 15" a mirror 15' is provided which is hingedly mounted so that its position may be adjusted by means of an operating button and arc-shaped slot.

The shutter 17 which is of the usual type is provided with a protecting cover 18 and a screen 19 is provided for the camera lens.

The lens 16 of the sighting means may be operated synchronously with the camera lens by means of the transmission gear shown in Figure 7. The camera lens is mounted in an externally threaded tube 70 so that it may be threaded in and out of the lens support box 71. On the threaded tube 70 there is fixed a spur gear 73 which is rotated for focusing purposes by means of a driver 74 along whose teeth the gear 73 may slide together with the lens. This is not only in order to focus the lens but also for lifting the lens support 37 from the sensitive layer when the sensitive layer is to be moved to a new position. This movement of the sensitive layer is accomplished by a lever 75 which is operated by the cam 57' fixed on the shaft 56 (Figure 5). The driver 74 is rotated by a gear 76 having lateral teeth mounted on the transmission shaft 77. At the other end of the shaft 77 there is connected a similar arrangement (not shown) for operating the lens of the sighting means 15. A regulation button may be provided.

There is shown in Figure 2 three arms 20 secured to the camera box projecting rearwardly and their outer ends are secured to a plate 21 on which is mounted the pistol grip 22 which is provided with a button switch for starting the motor 13 when the lighting has been turned on. The grip 22 is also provided with additional buttons 25, 25' and 25" by which different lighting effects may be obtained from lamps which have been placed near the subject. The grip 22 is provided with a trigger 23 which closes an electrical circuit (not shown) for energizing the magnet 47 (Figure 5). The energizing of the magnet 47 will pivot the lever 48 and thereby couple the part 44 of the coupling 43, 44 to the other part of the coupling 43. At the same time a ratchet tooth 45 provided on the coupling element 44 is withdrawn from a corresponding hole provided in the supporting block 46. The motor 13 therefore may now rotate the shaft 50 which is supported in the bearing blocks 46 and 46'. A disc 51 fixed to the shaft 50 is provided with a pin 51' which cooperates with the Maltese gear 52.

At the beginning of the rotation of the shaft 50 a disc fixed thereon having a pin 49 strikes the lever 49' and produces the exposure. Shortly thereafter the disc 51 engages with its pin 51' in the Maltest gear 52 which is supported by a shaft mounted in the block 53. A spur gear 54 is mounted on this shaft and meshes with a spur gear 55 fixed to the shaft 56. The rotation of the Maltest gear 52 therefore causes an intermittent driving of the shaft 56. Mounted on the shaft 56 is a cam cylinder 57 provided with the cam grooves 58 which control the large sized ratchet 34 (see Figure 4) which in turn moves the plate frame's supporting guide 31 on which it is fixed. The grooves 58 are spaced from one another the width of an exposure into which the sensitive layer is subdivided.

The plate frame 30 is guided on the supporting guide 31 so as to be vertically movable. This vertical movement is controlled by the ratchet steps 31' on the member 34 and the steps at one side are staggered with relation to the steps on the other side. Spring pressed detents 36 cooperate with the steps 31' so that when the member 34 has moved the supporting guide of the plate frame to an extreme end position the corresponding detent 36 strikes the side wall of the camera and releases the plate frame so that it may fall down one-half a step or until the opposite detent 36 engages the next staggered step. The grooves 58 are continuous so that the ratchet 34 and with it the supporting guide 31 are moved in continuous reciprocating motion. The number of the steps 31' on the right and left-hand sides of the supporting guide correspond to the number of the picture rows provided in the subdivisions of the sensitive layer.

For example as shown in Figure 3 a 9 x 12 cm. plate is subdivided for instance into 24 exposures. In order to easily determine the next exposure to be exposed the plate frame is provided with a cover 29 having the numbers from 1 to 24 thereon, while the folding cover 26 has in its movable portion a magnifying lens 28 which is directed upon the number corresponding to the portion of the layer which is to be exposed.

During the horizontal and vertical movements of the sensitive layer the lens support 37 which extends through an opening on the transverse bar 35 contacts the sensitive layer during the exposure and must therefore be lifted from the sensitive layer during movements thereof in order to avoid scratching the same. This lifting of the support 37 is secured by means of a cam 57' fixed on the shaft 56 of the cylinder 57. The cam acts on an arm 39' which operates the mechanism for lifting the lens. This mechanism comprises the lever 39" and a return spring 38. The supporting guide 31 is guided in its reciprocating movements by the bearing blocks 33 sliding on the transverse shaft 32.

If it is desired to operate the cam cylinder 57 manually this may be done by means of a lever 59 which disconnects the gears 54 and 55. An operating button 60 is provided for operating the lever 59 and a spring 61 after a manual operation returns the gear 55 into mesh with the gear 54 again.

Upon closing the circuit for the electromagnet 47 the various movements described above will take place completely because the coupling element 44 is prevented from returning to its original position until the pin 45 again enters the corresponding opening formed in the bearing 46.

The various electrical connections to the motor magnet lamps, etc. have not been shown since they are of the usual type.

What I claim is:

1. In a camera for shooting series of images on single compartments of a non-curling sensitive layer horizontally and vertically moved in the intervals between the single shots, driving means for the step by step movement of the sensitive layer, a motor, electromagnetic means coupling the driving means with the motor for the advancement of the layer only for one step from one to the other compartment and uncoupling it as soon as the new position of the layer is reached, a frame support having a ratchet, a rotating cylinder having an endless slot guiding said ratchet for obtaining the horizontal advancement, staggered steps on the side walls of the frame support and spring means cooperating with said steps for obtaining the vertical advancement.

2. In a camera for shooting series of images on single compartments of a non-curling sensitive layer horizontally and vertically moved in the intervals between the single shots, driving means for the step by step movement of the sensitive layer, a motor, electromagnetic means coupling the driving means with the motor for the advancement of the layer only for one step from one to the other compartment and uncoupling it as soon as the new position of the layer is reached, a frame support, a shaft, a cylinder on said shaft having a groove therein and a pin on said frame support guided in said groove in said cylinder.

3. In a camera for shooting series of images on single compartments of a non-curling sensitive layer horizontally and vertically moved in the intervals between the single shots, driving means for the step by step movement of the sensitive layer, a motor, electromagnetic means coupling the driving means with the motor for the advancement of the layer only for one step from one to the other compartment and uncoupling it as soon as the new position of the layer is reached, a frame support, a rotating cylinder having an endless groove therein and means cooperating with said groove for guiding said frame support.

WALTER ROSENHAFT.